(12) United States Patent
Laredo

(10) Patent No.: US 8,329,775 B2
(45) Date of Patent: *Dec. 11, 2012

(54) VISIBLE LIGHT ABSORBERS FOR OPHTHALMIC LENS MATERIALS

(75) Inventor: Walter R. Laredo, Fort Worth, TX (US)

(73) Assignee: Novartis AG, Basel (CH)

( * ) Notice: Subject to any disclaimer, the term of this patent is extended or adjusted under 35 U.S.C. 154(b) by 165 days.

This patent is subject to a terminal disclaimer.

(21) Appl. No.: 13/008,409

(22) Filed: Jan. 18, 2011

(65) Prior Publication Data

US 2011/0178202 A1    Jul. 21, 2011

Related U.S. Application Data

(60) Provisional application No. 61/295,900, filed on Jan. 18, 2010.

(51) Int. Cl.
| | |
|---|---|
| G02B 1/04 | (2006.01) |
| G02C 7/04 | (2006.01) |
| G02C 7/10 | (2006.01) |
| C09B 29/01 | (2006.01) |
| C09B 29/12 | (2006.01) |
| A61F 2/16 | (2006.01) |
| C08F 220/26 | (2006.01) |
| C08F 220/36 | (2006.01) |

(52) U.S. Cl. .......... 523/107; 523/106; 351/159.01; 351/159.02; 351/159.6; 351/159.65; 252/582; 534/839; 534/843; 534/850; 534/852; 623/6.11; 525/281; 526/312; 526/320; 526/328.5

(58) Field of Classification Search .......... 523/107, 523/106; 351/159.01, 159.02, 159.6, 159.65; 252/582; 534/839, 843, 850, 852; 623/6.11; 525/281; 526/312, 320, 328.5

See application file for complete search history.

(56) References Cited

U.S. PATENT DOCUMENTS

| | | | | |
|---|---|---|---|---|
| 3,190,876 | A | * | 6/1965 | Skoultchi et al. ............. 534/643 |
| 5,374,663 | A | | 12/1994 | Daicho et al. |
| 5,470,932 | A | | 11/1995 | Jinkerson |
| 5,528,322 | A | | 6/1996 | Jinkerson |
| 5,543,504 | A | | 8/1996 | Jinkerson |
| 5,662,707 | A | | 9/1997 | Jinkerson |
| 5,693,095 | A | | 12/1997 | Freeman et al. |
| 6,528,602 | B1 | | 3/2003 | Freeman et al. |
| 6,806,337 | B2 | | 10/2004 | Schlueter et al. |
| 6,846,897 | B2 | | 1/2005 | Salamone et al. |
| 6,852,793 | B2 | | 2/2005 | Salamone et al. |
| 6,872,793 | B1 | | 3/2005 | Schlueter |

(Continued)

FOREIGN PATENT DOCUMENTS

CN    1727338 A    2/2006

(Continued)

OTHER PUBLICATIONS

Davidenko, et al., Effect of the Interaction of Azobenzene Groups in Polymeric Composites on Their Electrooptical Characteristics, Theoretical and Experimental Chemistry, 2009, pp. 349-354, vol. 45, No. 6.

(Continued)

*Primary Examiner* — Michael Pepitone
(74) *Attorney, Agent, or Firm* — Patrick M. Ryan

(57) ABSTRACT

Azo compounds that block visible light are disclosed. These light absorbers are particularly suitable for use in intraocular lens materials.

19 Claims, 5 Drawing Sheets

U.S. PATENT DOCUMENTS

| | | |
|---|---|---|
| 7,037,954 B2 | 5/2006 | Baba et al. |
| 7,067,602 B2 | 6/2006 | Benz et al. |
| 7,098,283 B2 | 8/2006 | Lai |
| 7,101,949 B2 | 9/2006 | Salamone et al. |
| 7,278,737 B2 | 10/2007 | Mainster et al. |
| 7,304,117 B2 | 12/2007 | Lai |
| 7,326,423 B2 | 2/2008 | Pearson et al. |
| 7,662,937 B2 * | 2/2010 | Satake et al. ............ 534/591 |
| 7,691,918 B2 | 4/2010 | Jinkerson et al. |
| 7,728,051 B2 | 6/2010 | Weinschenk et al. |
| 8,188,203 B2 | 5/2012 | Pearson et al. |
| 2005/0054797 A1 | 3/2005 | Lai |
| 2007/0092830 A1 | 4/2007 | Lai et al. |
| 2007/0092831 A1 | 4/2007 | Lai et al. |
| 2008/0242818 A1 | 10/2008 | Benz et al. |
| 2009/0043105 A1 | 2/2009 | Weinschenk et al. |
| 2009/0088544 A1 | 4/2009 | Laredo |
| 2009/0093604 A1 | 4/2009 | Schlueter |
| 2009/0132039 A1 | 5/2009 | Cordova et al. |
| 2009/0137745 A1 | 5/2009 | Cordova et al. |
| 2010/0113641 A1 | 5/2010 | Laredo |

FOREIGN PATENT DOCUMENTS

| | | |
|---|---|---|
| JP | HEI1989299560 | 12/1989 |
| JP | 2232056 | 9/1990 |
| JP | 04220652 | 11/1992 |

OTHER PUBLICATIONS

International Search Report dated May 26, 2011 issued in PCT/US2011/021525 filed Jan. 13, 2011.

* cited by examiner

UV/Vis Spectrum of Compound B in CHCl$_3$, 1 mm Path Length

UV/Vis Spectra of Formulations 7L and 7M, 0.9 mm Thick Films

VISIBLE LIGHT ABSORBERS FOR OPHTHALMIC LENS MATERIALS

CROSS-REFERENCE TO RELATED APPLICATIONS

This application claims priority under 35 U.S.C. §119 to U.S. Provisional Patent Application No. 61/295,900, filed Jan. 18, 2010, the entire contents of which are incorporated herein by reference.

FIELD OF THE INVENTION

This invention is directed to visible light absorbers. In particular, this invention relates to novel azo compound monomers especially suitable for use in implantable ophthalmic lens materials.

BACKGROUND OF THE INVENTION

Both UV and visible light absorbers are known as ingredients for polymeric materials used to make ophthalmic lenses, and such absorbers may be used in combination with each other. These absorbers are preferably covalently bound to the polymeric network of the lens material instead of simply physically entrapped in the material to prevent them from migrating, phase separating or leaching out of the lens material. Such stability is particularly important for implantable ophthalmic lenses where the leaching of the absorber may present both toxicological issues and lead to the loss of visible light blocking activity in the implant.

Many absorbers contain conventional olefinic polymerizable groups, such as methacrylate, acrylate, methacrylamide, acrylamide or styrene groups. Copolymerization with other ingredients in the lens materials, typically with a radical initiator, incorporates the absorbers into the resulting polymer chain. Incorporation of additional functional groups on an absorber may influence one or more of the absorber's light-absorbing properties, solubility or reactivity. If the absorber does not have sufficient solubility in the remainder of the ophthalmic lens material ingredients or polymeric lens material, the absorber may coalesce into domains that could interact with light and result in decreased optical clarity of the lens.

Examples of visible light absorbers suitable for use in intraocular lenses can be found in U.S. Pat. No. 5,470,932. What is needed are additional visible light absorbing compounds that are copolymerizable with other ingredients in implantable lens materials, relatively inexpensive to synthesize, and are efficient in absorbing light between approximately 380-495 nm.

SUMMARY OF THE INVENTION

The present invention provides novel azo compounds that satisfy the above objectives. These azo compounds are especially suitable for use as monomers that absorb a portion of visible light (approximately 380-495 nm). These absorbers are suitable for use in ophthalmic lenses, including contact lenses. They are particularly useful in implantable lenses, such as intraocular lenses (IOLs).

The azo compounds of the present invention contain reactive groups, which allow for covalent attachment of the absorbers to ocular lens materials. Additionally, the absorbers of the present invention can be synthesized in approximately 2-3 steps from readily available, inexpensive starting materials without the need for column chromatography.

The present invention also relates to ophthalmic device materials containing such azo compounds

DETAILED DESCRIPTION OF THE INVENTION

Figure 1:
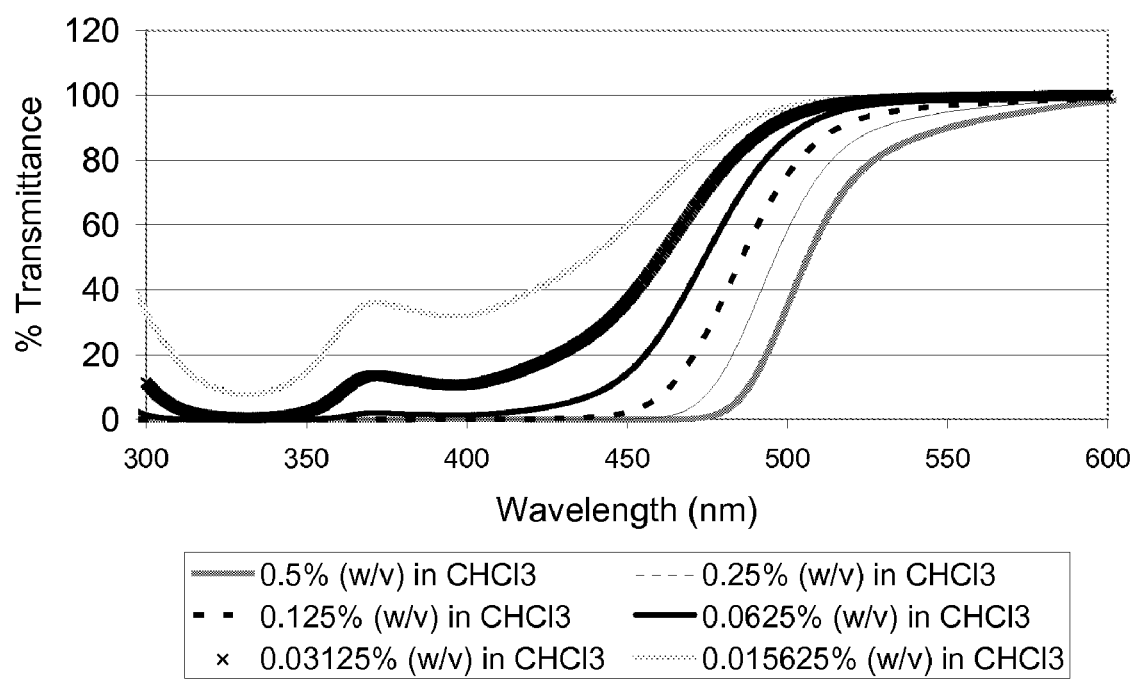
FIG. 1 shows the UV/Vis spectra of Compound A at 0.01-0.5% (w/v) in $CHCl_3$.

Unless indicated otherwise, all ingredient amounts expressed in percentage terms are presented as % w/w.

The azo compounds of the present invention have the following is structure:

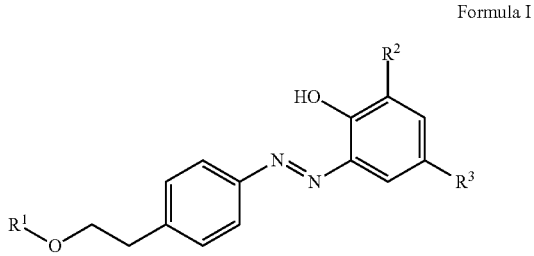

Formula I wherein
$R^1$=C(O)CH=$CH_2$, C(O)C($CH_3$)=$CH_2$, C(O)NH$CH_2CH_2$OC(O)C($CH_3$)=$CH_2$, or C(O)NHC($CH_3$)$_2C_6H_4$C($CH_3$)=$CH_2$;

$R^2$=H, $C_1$-$C_4$ alkyl, or $C_1$-$C_4$ alkoxy;

$R^3$=H, $C_1$-$C_4$ alkyl, F, Cl, Br, CN, $NO_2$, COO$R^4$; XOC(O)CH=$CH_2$, XOC(O)C($CH_3$)=$CH_2$, XOC(O)NH$CH_2CH_2$OC(O)C($CH_3$)=$CH_2$, or XOC(O)NHC($CH_3$)$_2C_6H_4$C($CH_3$)=$CH_2$;

$R^4$=H or $C_1$-$C_4$ alkyl; and
X=$C_1$-$C_4$ alkyl or $C_2$-$C_4$ alkenyl.

Preferred compounds of Formula I are those wherein
$R^1$=C(O)CH=$CH_2$, C(O)C($CH_3$)=$CH_2$, or C(O)NHCH$_2$CH$_2$OC(O)C($CH_3$)=$CH_2$;
$R^2$=H or $C_1$-$C_4$ alkyl;
$R^3$=H, $C_1$-$C_4$ alkyl, F, Cl, Br, CN, $NO_2$, COOR$^4$; XOC(O)CH=$CH_2$, XOC(O)C($CH_3$)=$CH_2$, or XOC(O)NHCH$_2$CH$_2$OC(O)C($CH_3$)=$CH_2$;
$R^4$=$C_1$-$C_4$ alkyl; and
X=$C_1$-$C_4$ alkyl.

Most preferred compounds of Formula I are those wherein
$R^1$=C(O)C($CH_3$)=$CH_2$ or C(O)NHCH$_2$CH$_2$OC(O)C($CH_3$)=$CH_2$;
$R^2$=H;
$R^3$=H, $C_1$-$C_4$ alkyl, F, Cl, Br, XOC(O)C($CH_3$)=$CH_2$ or XOC(O)NHCH$_2$CH$_2$OC(O)C($CH_3$)=$CH_2$; and
X=$C_1$-$C_4$ alkyl.

Especially preferred compounds of Formula I are (E)-4-((2-hydroxy-5-methylphenyl)diazenyl)phenethyl methacrylate ("Compound A") and (E)-4-hydroxy-3-((4-(2-(methacryloyloxy)ethyl)phenyl)diazenyl)phenethyl methacrylate ("Compound B").

A representative synthesis of the azo compounds of Formula I is as follows. The compounds of Formula I are synthesized in 2-3 steps.

1. In steps 1-2, the diazonium salt of an aniline derivative is prepared and subsequently reacted with a desired phenol compound to form an azo dye.

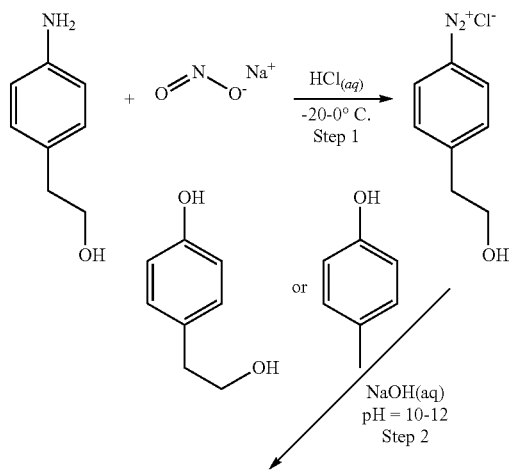

Compound A

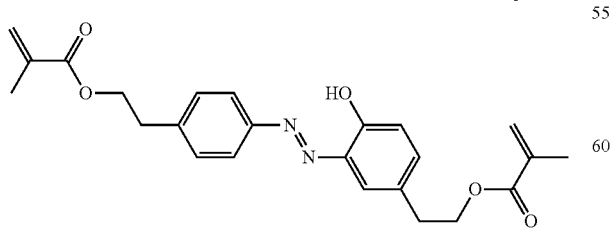

Chemical Formula: $C_{19}H_{20}N_2O_3$
Molecular Weight: 324.37

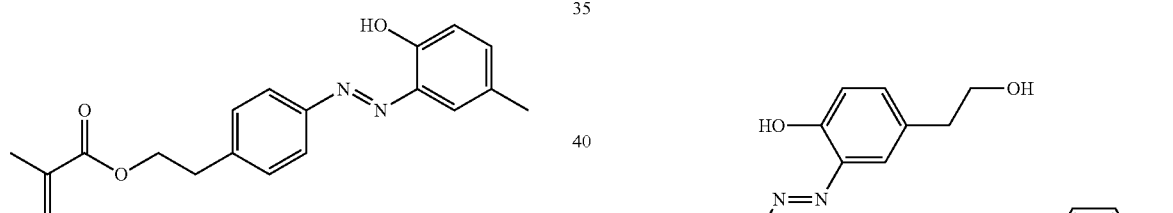

Azo dyes

Compound B

Chemical Formula: $C_{24}H_{26}N_2O_5$
Molecular Weight: 422.47

2. In step 3, the free primary alcohol groups of the azo dyes are esterified to form a polymerizable azo dye containing at least one (meth)acrylate group. The (meth)acrylate group can then form covalent bonds when reacted with vinyl monomers, co-monomers, macromers, crosslinking agents, and other components typically used in the manufacturing of IOLs.

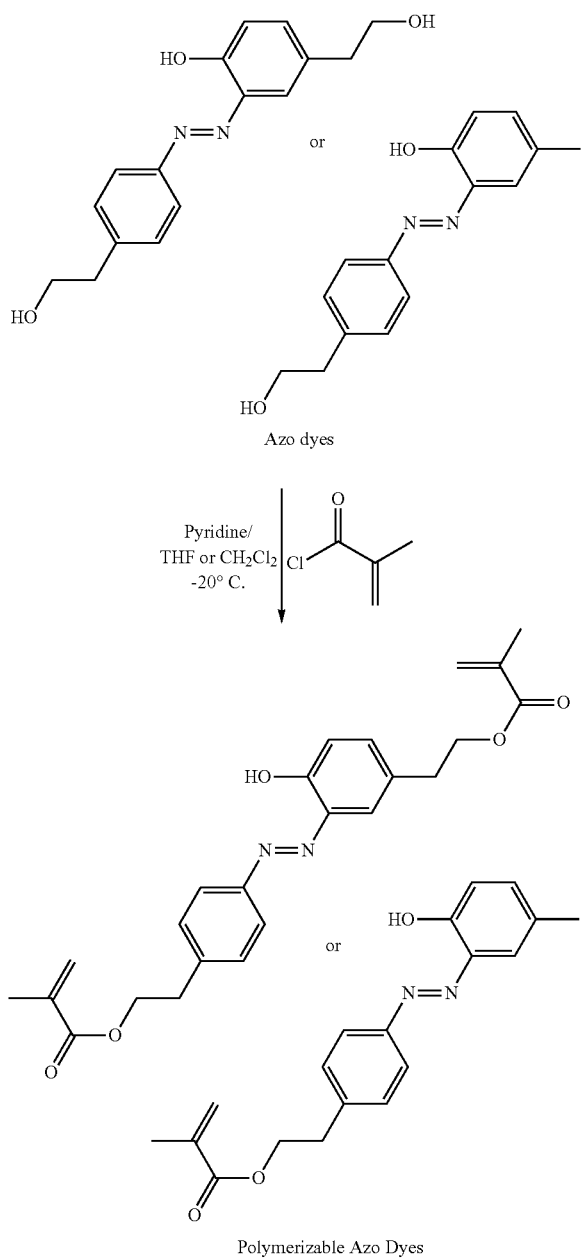

Azo dyes

Polymerizable Azo Dyes

The azo compounds of the present invention are suitable for use in ophthalmic device materials, particularly IOLs. IOL materials will generally contain from 0.005 to 0.2% (w/w) of a compound of Formula I. Preferably, IOL materials will contain from 0.01 to 0.1% (w/w) of a compound of the present invention. Most preferably, IOL materials will contain from 0.01 to 0.05% (w/w) of a compound of the present invention. Such device materials are prepared by copolymerizing the compounds of Formula I with other ingredients, such as device-forming materials, cross-linking agents. The IOL or other ophthalmic device materials containing the compounds of Formula I optionally contain UV absorbers and other visible light absorbers.

Many device-forming monomers are known in the art and include both acrylic and silicone-containing monomers among others. See, for example, U.S. Pat. Nos. 7,101,949; 7,067,602; 7,037,954; 6,872,793 6,852,793; 6,846,897; 6,806,337; 6,528,602; and 5,693,095. In the case of IOLs, any known IOL device material is suitable for use in the compositions of the present invention. Preferably, the ophthalmic device materials comprise an acrylic or methacrylic device-forming monomer. More preferably, the device-forming monomers comprise a monomer of formula II:

where in formula II:
A is H, $CH_3$, $CH_2CH_3$, or $CH_2OH$;
B is $(CH_2)_m$ or $[O(CH_2)_2]_z$;
C is $(CH_2)_w$;
m is 2-6;
z is 1-10;
Y is nothing, O, S, or NR', provided that if Y is O, S, or NR', then B is $(CH_2)_m$;
R' is H, $CH_3$, $C_{n'}H_{2n'+1}$ (n'=1-10), iso-$OC_3H_7$, $C_6H_5$, or $CH_2C_6H_5$;
w is 0-6, provided that m+w$\leq$8; and
D is H, $C_1$-$C_4$ alkyl, $C_1$-$C_4$ alkoxy, $C_6H_5$, $CH_2C_6H_5$ or halogen.

Preferred monomers of formula II are those wherein A is H or $CH_3$, B is $(CH_2)_m$, m is 2-5, Y is nothing or O, w is 0-1, and D is H. Most preferred are 2-phenylethyl methacrylate; 4-phenylbutyl methacrylate; 5-phenylpentyl methacrylate; 2-benzyloxyethyl methacrylate; and 3-benzyloxypropyl methacrylate; and their corresponding acrylates.

Monomers of formula II are known and can be made by known methods. For example, the conjugate alcohol of the desired monomer can be combined in a reaction vessel with methyl methacrylate, tetrabutyl titanate (catalyst), and a polymerization inhibitor such as 4-benzyloxy phenol. The vessel can then be heated to facilitate the reaction and distill off the reaction by-products to drive the reaction to completion. Alternative synthesis schemes involve adding methacrylic acid to the conjugate alcohol and catalyzing with a carbodiimide or mixing the conjugate alcohol with is methacryloyl chloride and a base such as pyridine or triethylamine.

Device materials generally comprise a total of at least about 75%, preferably at least about 80%, of device-forming monomers.

In addition to an absorber of the present invention and a device-forming monomer, the device materials of the present invention generally comprise a cross-linking agent. The cross-linking agent used in the device materials of this invention may be any terminally ethylenically unsaturated compound having more than one unsaturated group. Suitable cross-linking agents include, for example: ethylene glycol dimethacrylate; diethylene glycol dimethacrylate; allyl methacrylate; 1,3-propanediol dimethacrylate; 2,3-propanediol dimethacrylate; 1,6-hexanediol dimethacrylate; 1,4-butanediol dimethacrylate; $CH_2$=$C(CH_3)C$(=O)O—$(CH_2CH_2O)_p$—C(=O)C($CH_3$)=$CH_2$ where p=1-50; and $CH_2$=$C(CH_3)C$(=O)O($CH_2)_tO$—C(=O)C($CH_3$)=$CH_2$ where t=3-20; and their corresponding acrylates. A preferred cross-linking monomer is $CH_2$=$C(CH_3)C$(=O)O—$(CH_2CH_2O)_p$—C(=O)C($CH_3$)=$CH_2$ where p is such that the number-average molecular weight is about 400, about 600, or about 1000.

Generally, the total amount of the cross-linking component is at least 0.1% by weight and, depending on the identity and concentration of the remaining components and the desired physical properties, can range to about 20% by weight. The preferred concentration range for the cross-linking component is 1-5% for small, hydrophobic compounds with molecular weights typically less than 500 Daltons, and 5-17% (w/w) for larger, hydrophilic compounds with molecular weights typically between 500-5000 Daltons.

Suitable polymerization initiators for device materials containing a compound of the present invention include thermal initiators and photoinitiators. Preferred thermal initiators include peroxy free-radical initiators, such as t-butyl (peroxy-2-ethyl)hexanoate and di-(tert-butylcyclohexyl) peroxydicarbonate (commercially available as Perkadox® 16 from Akzo Chemicals Inc., Chicago, is Illinois). Preferred photoinitiators include phenylbis(2,4,6-trimethylbenzoyl)-phosphine oxide and diphenyl(2,4,6-trimethylbenzoyl)-phosphine oxide. Initiators are typically present in an amount of about 5% (w/w) or less. Because free-radical initiators do not become chemically a part of the polymers formed, the total amount of initiator is customarily not included when determining the amounts of other ingredients.

The device materials containing an azo compound of the present invention optionally also contain a UV absorber and/or other visible light absorber. Many reactive (copolymerizable) UV absorbers suitable for use in implantable ophthalmic lenses and devices are known. Preferred UV absorbers include those disclosed in commonly assigned, co-pending U.S. Published Application No. 2010/0113641. UV absorbers are typically present in intraocular lens materials.

In addition to the azo compound of Formula I, a device-forming monomer, a cross-linking agent, and optionally a UV absorber or other visible light absorber, the materials of the present invention may also contain other ingredients, including but not limited to agents to reduce tack or glistenings. Examples of agents to reduce tack are those disclosed in U.S. Publication Nos. 2009/0132039 A1 and 2009/0137745 A1. Examples of agents to reduce glistenings are those disclosed in U.S. Publication Nos. 2009/0093604 A1 and 2009/0088544 A1.

IOLs constructed of the materials of the present invention can be of any design capable of being rolled or folded into a small cross section that can fit through a relatively smaller incision. For example, the IOLs can be of what is known as a one piece or multipiece design, and comprise optic and haptic components. The optic is that portion which serves as the lens. The haptics are attached to the optic and hold the optic in its proper place in the eye. The optic and haptic(s) can be of the same or different material. A multipiece lens is so called because the optic and the haptic(s) are made separately and then the haptics are attached to the optic. In a single piece lens, the optic and the haptics are formed out of one piece of material. Depending on the material, the haptics are then cut, or lashed, out of the material to produce the IOL.

In addition to IOLs, the materials of the present invention are also suitable for use in other ophthalmic devices, such as contact lenses, keratoprostheses, and corneal inlays or rings.

The invention will be further illustrated by the following examples, which are intended to be illustrative, but not limiting.

EXAMPLE 1

Synthesis of 2-((4-(2-hydroxyethyl)phenyl)-diazenyl)-4-methylphenol. In a 500 ml round bottom flask equipped with a magnetic stirrer was added 10.26 g (74.82 mmol) 4-aminophenethyl alcohol (98%, Aldrich), 31 ml conc. HCl (aq) (J. T. Baker), deionized water (100 ml), and absolute ethanol (100 ml). The reaction mixture was cooled to 0° C. and 5.456 g (79.07 mmol) sodium nitrite in 30 ml water was added dropwise over 30 minutes. The reaction mixture was stirred at 0° C. for an additional 40 minutes. 300 mg sulfamic acid (Aldrich) was added to destroy excess nitrite and the mixture was stirred for an additional 20 minutes. p-Cresol (24.4 g, 226 mmol) (Alfa Aesar) was dissolved in 200 ml deionized water and 200 ml ethanol. A solution of 21.45 g (536.3 mmol) NaOH in 100 ml water was prepared and approximately one half was added to the p-cresol solution. The p-cresol containing mixture was cooled to 0° C. The diazonium mixture and remaining NaOH solution were added simultaneously to the p-cresol mixture over 60 minutes. The reaction mixture was stirred for 20 hours at room temperature and then poured into 3.5 L deionized water and acidified to pH 4-5 with 1 N HCl. The solid was filtered and rinsed with ample amounts of water. The solid was dried under high vacuum until constant weight to afford 14.1 g (73%) of a dark yellow product.

$^1$H NMR (DMF-D$_7$) delta: 11.88 (s, 1H, Ar—OH), 8.13 (d, 2H, Ar—H), 7.87 (s, 1H, Ar—H), 7.69 (d, 2H, Ar—H), 7.47 (d, 1H, Ar—H), 7.16 (d, 1H, Ar—H), 4.93 (s, 1H, alkyl-OH), 3.98 (m, 2H, Ar—CH$_2$CH$_2$), 3.09 (m, 2H, Ar—CH$_2$CH$_2$), 2.54 (s, 3H, Ar—CH$_3$).

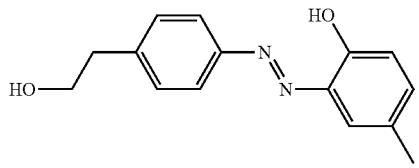

EXAMPLE 2

Synthesis of 4-((2-hydroxy-5-methylphenyl)diazenyl) phenethyl methacrylate. In a 250 ml 3-neck round bottom flask equipped with a magnetic stirrer and gas inlet was dissolved 8.21 g (32.0 mmol) 2-((4-(2-hydroxyethyl)phenyl) diazenyl)-4-methylphenol in 200 ml anhydrous THF. ~50 mg 4-Methoxyphenol (50 mg, Aldrich) was added followed by 20.1 g (254 mmol) anhydrous pyridine. The reaction mixture was cooled to −20° C. and 4.75 g (45.4 mmol) methacryloyl chloride was added dropwise. The reaction mixture was stirred for 1 hour at −20° C. and 20 hours at ambient temperature. The solid was filtered and 200 ml diethyl ether was added to the filtrate. Ethyl acetate (100 ml) was also added to aid in the separation. The organic layer was washed with 0.5 N HCl, and then dried over magnesium sulfate and then filtered. The solvent was removed under removed pressure and the crude product was recrystallized in ethanol to give an orange solid which was rinsed with cold ethanol and dried overnight under high vacuum at room temperature to afford 3.1 g (30%). $^1$H NMR (CDCl$_3$) delta: 12.67 (s, 1H, Ar—OH), 7.82 (d, 2H, Ar—H), 7.73 (s, 1H, Ar—H), 7.38 (d, 2H, Ar—H), 7.15 (d, 1H, Ar—H), 6.93 (d, 1H, Ar—H), 6.08 (s, 1H, vinyl-H), 5.56 (s, 1H, vinyl-H), 4.41 (m, 2H, CH$_2$OCO), 3.07 (m, 2H, Ar—CH$_2$), 2.38 (s, 3H, Ar—CH$_3$), 1.93 (s, 3H, C═C—CH$_3$).

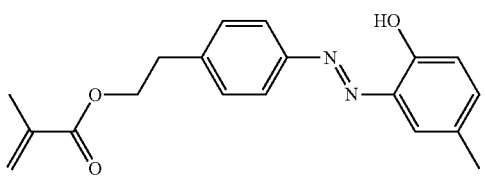

EXAMPLE 3

Synthesis of 4-(2-hydroxyethyl)-2-((4-(2-hydroxyethyl)phenyl)diazenyl)phenol. In a 500 ml round bottom flask equipped with a magnetic stirrer was added 9.98 g (72.8 mmol) 4-aminophenethyl alcohol (98%, Aldrich), 31 ml conc. HCl (aq) (J. T. Baker), deionized water (150 ml), and absolute ethanol (150 ml). The reaction mixture was cooled to 0° C. and 5.31 g (77.0 mmol) sodium nitrite in 30 ml water was added dropwise over 15 minutes. The reaction mixture was stirred at 0° C. for an additional 40 minutes. 300 mg sulfamic acid (Aldrich) was added to destroy excess nitrite and the mixture was stirred for an additional 10 minutes. In a 2 L round bottom flask equipped with magnetic stirrer and addition funnel was added 4-(2-Hydroxyethyl)phenol (30.6 g, 222 mmol) (TCI America), 200 ml deionized water, and 200 ml ethanol. A solution of 21.7 g (543 mmol) NaOH in 100 ml water was prepared and approximately one fourth was added to the 4-(2-hydroxyethyl)phenol solution and the mixture was cooled to 0° C. The diazonium mixture and remaining NaOH solution were added simultaneously to the 4-(2-hydroxyethyl)phenol mixture over 60 minutes. The reaction mixture was stirred for 2 hours at 0° C. followed by 4 hours room temperature and then poured into 3.5 L deionized water and acidified to pH 4-5 with 1 N HCl. The solid was filtered and rinsed with ample amounts of water. The solid was dried under high vacuum until constant weight to afford 8 g (38%) of a solid. $^1$H NMR (DMF-D$_7$) delta: 11.78 (s, 1H, Ar—OH), 7.97 (d, 2H, Ar—H), 7.79 (s, 1H, Ar—H), 7.52 (d, 2H, Ar—H), 7.38 (d, 1H, Ar—H), 7.02 (d, 1H, Ar—H), 4.75 (s, 1H, alkyl-OH), 4.71 (s, 1H, alkyl-OH), 3.82 (bm, 4H, 2 Ar—CH$_2$CH$_2$OH), 2.93 (bm, 4H, 2Ar—CH$_2$CH$_2$OH).

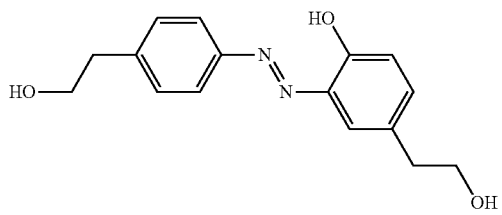

EXAMPLE 4

Synthesis of 4-hydroxy-3-((4-(2-(methacryloyloxy)ethyl)phenyl)diazenyl)phenethyl methacrylate. In a 250 ml 3-neck round bottom flask equipped with a magnetic stirrer and gas inlet was dissolved 4.97 g (17.4 mmol) 4-(2-hydroxyethyl)-2-((4-(2-hydroxyethyl)phenyl)diazenyl)phenol in 200 ml anhydrous THF. 4-Methoxyphenol (50 mg, Aldrich) was added followed by 94 g (1.2 mol) anhydrous pyridine. The reaction mixture was cooled to −20° C. and 4.10 g (39.2 mmol) methacryloyl chloride was added dropwise. The reaction mixture was stirred for 1 hour at −20° C. and 20 hours at ambient temperature. The solid was filtered and 200 ml diethyl ether was added to the filtrate. Ethyl acetate (100 ml) was also added to aid in the separation. The organic layer was washed with 0.5 N HCl, dried over magnesium sulfate, and then filtered. The solvent was removed under removed pressure and the crude product was recrystallized in ethanol to give an orange solid which was rinsed with cold ethanol and dried overnight under high vacuum at room temperature to afford 2.0 g (40%). $^1$H NMR (CD$_2$Cl$_2$) delta: 12.67 (s, 1H, Ar—Ohio), 7.86-7.88 (m, 3H, Ar—H), 7.47 (m, 2H, Ar—H), 7.30 (m, 1H, Ar—H), 7.00 (m, 1H, Ar—H), 6.11 (s, 2H, vinyl-H), 5.59 (s, 2H, vinyl-H), 4.40-4.45 (m, 4H, 2O=COCH$_2$), 3.05-3.13 (m, 4H, 2Ar—CH$_2$CH$_2$OC=O), 1.96 (bs, 6H, 2O=CC(CH$_3$)=CH$_2$).

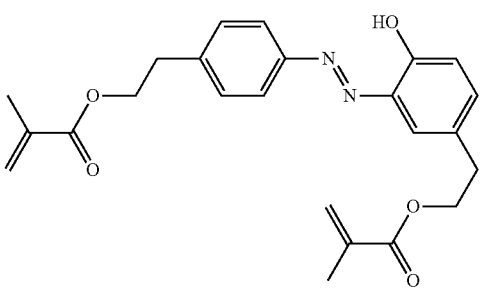

EXAMPLE 5

Transmittance curves for Compound A at 0.01-0.5% and Compound B at 0.005-0.1% were generated by UV/Vis spectroscopy. Briefly, the tested compound (A or B) was dissolved in chloroform at the indicated concentration and evaluated in a PerkinElmer Lambda 35 UV/Vis spectrometer. The results are shown in FIGS. 1 through 4. These results show that Compounds A and B are effective dyes for the absorption of UV light between 300-400 nm and violet light between approximately 400-450 nm.

EXAMPLE 6

Figure 2:
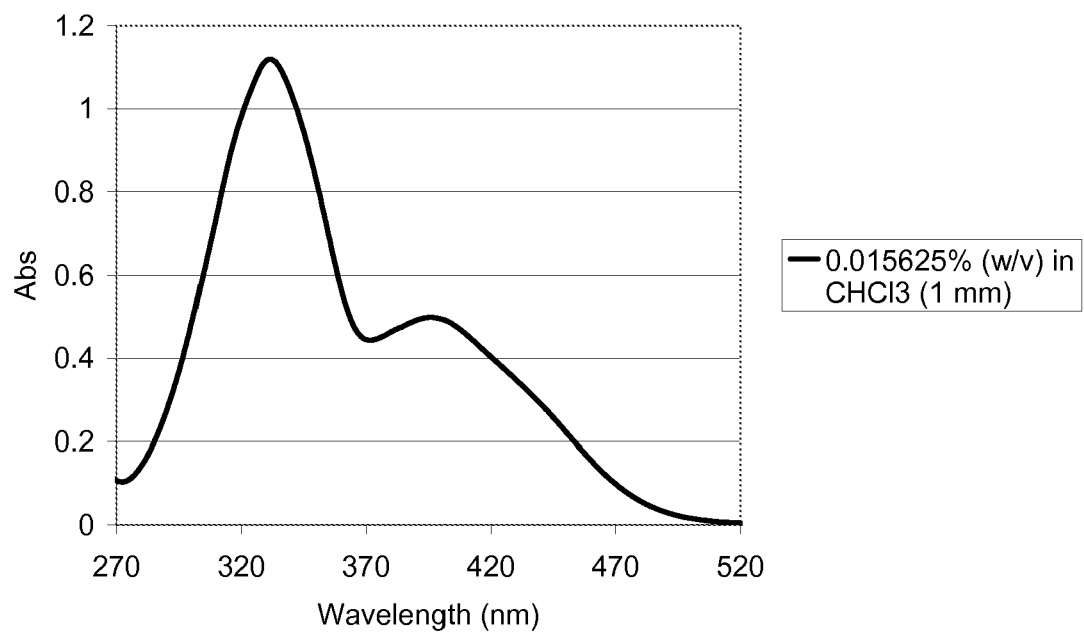
FIG. 2 shows the UV/Vis spectra of Compound A at a concentration of 480 µM.
Figure 3:
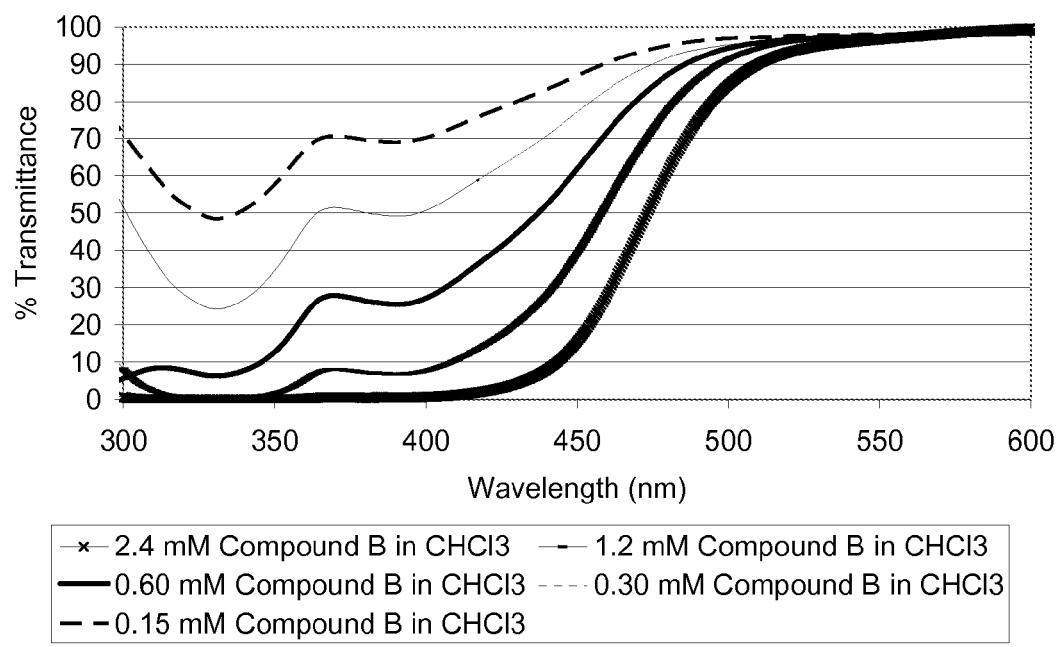
FIG. 3 shows the UV/Vis spectra of Compound B at 150-2400 µM in $CHCl_3$.
Figure 4:
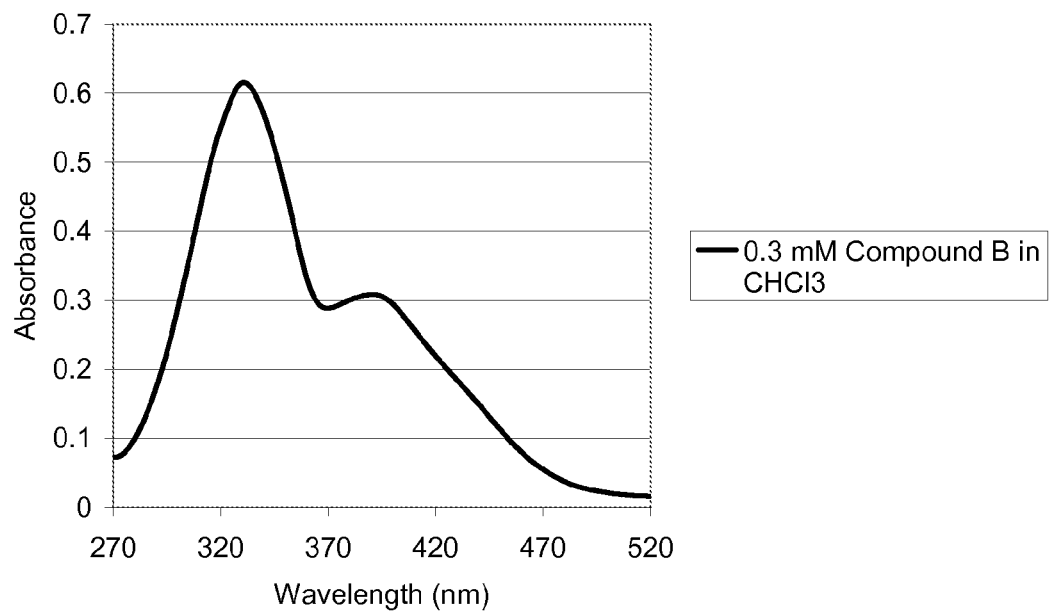
FIG. 4 shows the UV/Vis spectra of Compound B at a concentration of 300 µM.

The molar absorptivities of Compound A and Compound B were measured to determine effectiveness in light absorption at lambda max values. The UV/Vis absorption curves and molar absorptivity values are shown in FIG. 2 and FIG. 4 and in Table 1 below.

TABLE 1

| Molar absorptivity values of Compound A and Compound B | | |
|---|---|---|
| Compound | Wavelength | $\epsilon$ (L · mol$^{-1}$ · cm$^{-1}$) |
| A | Lambda Max 1 = 332 nm | 23,200 |
| A | Lambda Max 2 = 396 nm | 10,300 |
| B | Lambda Max 1 = 331 nm | 20,600 |
| B | Lambda Max 2 = 391 nm | 10,300 |

EXAMPLE 7

Acrylic IOL Formulations

Compounds of Formula I may be formulated in IOL materials as shown in Tables 2-5 below. All components are vortex mixed in a 30 ml glass vial, degassed with nitrogen, and then syringe filtered using a 0.2 micron Teflon filter into polypropylene molds. Samples are thermally cured at 70° C. for 1 hour and 110° C. for 2 hours or photo cured at ambient temperature for 30 minutes using a Philips TL 20W/03 T lamp at ambient temperature and then extracted in acetone at 50° C. for 6 hours with fresh solvent replacement every 90 minutes.

TABLE 2

| Component | EXAMPLE (% w/w) | | | |
|---|---|---|---|---|
| | 7A | 7B | 7C | 7D |
| Compound A | 0.0208 | 0.020 | 0.020 | 0.024 |
| UV-1 | 1.48 | 1.49 | 1.50 | 1.52 |
| PEA | 73.1 | 73.9 | 0 | 73.6 |
| PEMA | 20.9 | 20.0 | 0 | 19.3 |
| BzA | 0 | 0 | 94.0 | 0 |
| Secondary alcohol ethoxylate, methacrylic acid ester | 3.00 | 3.03 | 3.00 | 3.00 |
| BDDA | 1.53 | 1.49 | 1.50 | 1.53 |
| PSMA | 0 | 0 | 0 | 1.00 |
| Perkadox 16S | 0 | 0.99 | 1.0 | 1.01 |
| AIBN | 0.50 | 0 | 0 | 0 |

UV-1 = 2-hydroxy-5-methoxy-3-(5-(trifluoromethyl)-2H-benzo[d][1,2,3]-triazol-2-yl)benzyl methacrylate
PEA = 2-phenylethyl acrylate
PEMA = 2-phenylethyl methacrylate
BzA = benzyl acrylate
BDDA = 1,4-butanediol diacrylate
Secondary alcohol ethoxylate, methacrylic acid ester = methacrylic acid ester of Tergitol ™ NP-70 surfactant (Dow/Union Carbide)
AIBN = 2,2'-Azobis(2-methylpropionitrile)
Perkadox 16S = di-(4-tert-butylcyclohexyl) peroxydicarbonate (AkzoNobel)
PSMA = polystyrene, methacrylate terminated (Aldrich, $M_n$ ~12,000). solution (33 wt. % in cyclohexane) filtered and precipitated.

TABLE 3

| Component | EXAMPLE (% w/w) | | |
|---|---|---|---|
| | 7D | 7E | 7F |
| Compound A | 0.030 | 0.0202 | 0.025 |
| UV-1 | 1.51 | 1.46 | 1.50 |
| PEA | 73.1 | 0 | 73.6 |
| PEMA | 20.9 | 0 | 19.3 |
| BzA | 0 | 94.1 | 0 |
| polyPEGMA | 3.00 | 3.00 | 3.01 |
| BDDA | 1.53 | 1.45 | 1.53 |
| PSMA | 0 | 0 | 1.00 |
| Perkadox 16S | 0 | 1.04 | 0.99 |
| AIBN | 0.50 | 0 | 0 |

PolyPEGMA = Macromonomer of poly(ethylene glycol) monomethyl ether methacrylate (MW = 550), Mn (SEC): 4100 Daltons, Mn (NMR): 3200 Daltons, PDI = 1.50.

TABLE 4

| Component | EXAMPLE (% w/w) | | | |
|---|---|---|---|---|
| | 7G | 7H | 7I | 7J |
| Compound A | 0.02 | 0.02 | 0.02 | 0.02 |
| UV-1 | 1.12 | 1.12 | 1.12 | 1.12 |
| PEA | 0 | 74.1 | 73.3 | 74.3 |
| PEMA | 0 | 19.9 | 20.0 | 20.0 |
| BzA | 94.3 | 0 | 0 | 0 |
| polyPEGMA | 0 | 0 | 0 | 3.00 |
| polyPEGMA2 | 3.02 | 3.25 | 3.06 | 0 |
| BDDA | 1.53 | 1.54 | 1.50 | 1.52 |
| PSMA | 0 | 0 | 1.00 | 0 |
| Perkadox 16S | 0 | 0 | 1.25 | 0 |
| AIBN | 0.50 | 0.50 | 0 | 0.50 |

PolyPEGMA2 = Macromonomer of poly(ethylene glycol) monomethyl ether methacrylate (MW = 475), Mn (SEC): 11,000 Daltons, PDI = 1.2.

TABLE 5

| Component | EXAMPLE (% w/w) | | |
|---|---|---|---|
| | 7K | 7L | 7M |
| Compound B | 0 | 0.030 | 0.029 |
| UV-2 | 1.83 | 1.81 | 1.81 |
| PEA | 79.7 | 79.7 | 79.7 |
| HEMA | 15.2 | 15.2 | 15.2 |
| BDDA | 3.26 | 3.25 | 3.26 |
| Irgacure 819 | 0 | 0.30 | 0 |
| AIBN | 0.50 | 0 | 0.51 |

UV-2 = 3-(2H-benzo[d][1,2,3]triazol-2-yl)-2-hydroxy-5-methoxybenzyl methacrylate
HEMA = 2-hydroxyethyl methacrylate
Irgacure 819 = phenylbis(2,4,6-trimethylbenzoyl)-phosphine oxide.

EXAMPLE 8

Photostability

Samples of Formulation 7J (containing Compound A) were subject to UV radiation from 300 to 800 nm using an Atlas Suntest CPS+ test chamber (Atlas Electric Devices Company, Chicago, Ill.) utilizing a xenon arc lamp with light intensity of approximately 8-10 mW/cm² at the height of the test sample. The temperature of the PBS medium was 35° C. UV/Vis spectra from 0.9 mm thick sample sections were collected using a PerkinElmer Lambda 35 UV/Vis spectrometer. No photo decomposition was observed as indicated by overlapping of spectra before and after irradiation.

Figure 5:
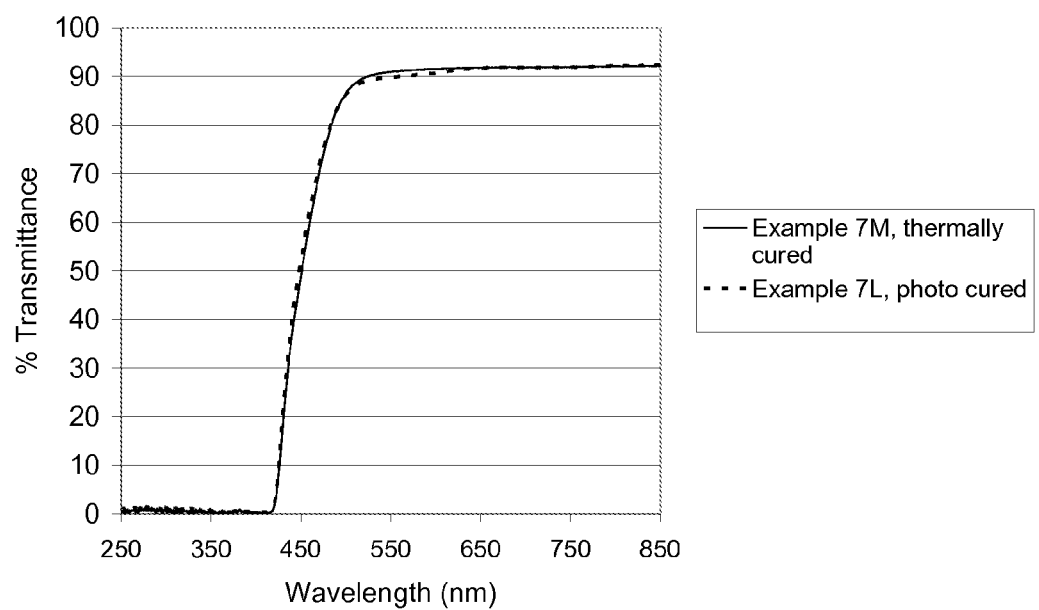
FIG. 5 shows the UV/Vis spectra of two formulations of Compound B.

Samples of Formulation 7L (containing Compound B) were polymerized using blue light radiation from 400 to 450 nm using a Philips TL 20W/03 T lamp with light intensity of approximately 1-2 mW/cm² at the height of the test sample. Samples were polymerized for 30 minutes, 90 minutes, and 18.5 hours at ambient temperature without additional external heat sources. The UV/Vis spectra of Formulation 7L was compared to that of 7M which was thermally cured using AIBN. Minimal to no photobleaching of Formulation 7L was observed. The results are shown in FIG. 5.

This invention has been described by reference to certain preferred embodiments; however, it should be understood that it may be embodied in other specific forms or variations thereof without departing from its special or essential characteristics. The embodiments described above are therefore considered to be illustrative in all respects and not restrictive, the scope of the invention being indicated by the appended claims rather than by the foregoing description.

I claim:
1. An azo compound of the formula

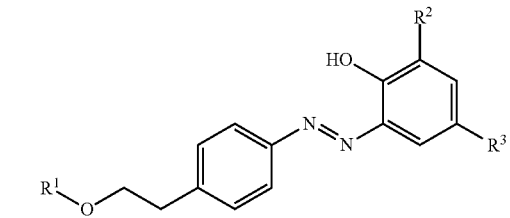

wherein
$R^1$=C(O)CH=CH$_2$, C(O)C(CH$_3$)=CH$_2$, C(O)NHCH$_2$CH$_2$OC(O)C(CH$_3$)=CH$_2$, or C(O)NHC(CH$_3$)$_2$C$_6$H$_4$C(CH$_3$)=CH$_2$;
$R^2$=H, C$_1$-C$_4$ alkyl, or C$_1$-C$_4$ alkoxy;

$R^3$=H, $C_1$-$C_4$ alkyl, F, Cl, Br, CN, $NO_2$, $COOR^4$; XOC(O)CH=$CH_2$, XOC(O)C($CH_3$)=$CH_2$, XOC(O)NHCH$_2$CH$_2$OC(O)C(CH$_3$)=CH$_2$, or XOC(O)NHC(CH$_3$)$_2$C$_6$H$_4$C(CH$_3$)=CH$_2$;

$R^4$=H or $C_1$-$C_4$ alkyl; and

X=$C_1$-$C_4$ alkyl or $C_2$-$C_4$ alkenyl.

2. The azo compound of claim 1 wherein
$R^1$=C(O)CH=CH$_2$, C(O)C(CH$_3$)=CH$_2$, C(O)NHCH$_2$CH$_2$OC(O)C(CH$_3$)=CH$_2$;
$R^2$=H or $C_1$-$C_4$ alkyl;
$R^3$=H, $C_1$-$C_4$ alkyl, F, Cl, Br, CN, $NO_2$, $COOR^4$; XOC(O)CH=CH$_2$, XOC(O)C(CH$_3$)=CH$_2$, or XOC(O)NHCH$_2$CH$_2$OC(O)C(CH$_3$)=CH$_2$;
$R^4$=$C_1$-$C_4$ alkyl; and
X=$C_1$-$C_4$ alkyl.

3. The azo compound of claim 2 wherein
$R^1$=C(O)C(CH$_3$)=CH$_2$ or C(O)NHCH$_2$CH$_2$OC(O)C(CH$_3$)=CH$_2$;
$R^2$=H;
$R^3$=H, $C_1$-$C_4$ alkyl, F, Cl, Br, XOC(O)C(CH$_3$)=CH$_2$ or XOC(O)NHCH$_2$CH$_2$OC(O)C(CH$_3$)=CH$_2$; and
X=$C_1$-$C_4$ alkyl.

4. The azo compound of claim 2 wherein the compound is selected from the group consisting of (E)-4-((2-hydroxy-5-methylphenyl)diazenyl)phenethyl methacrylate and (E)-4-hydroxy-3-((4-(2-(methacryloyloxy)ethyl)phenyl)diazenyl) phenethyl methacrylate.

5. An ophthalmic device material comprising the azo compound of claim 1 and a device-forming monomer selected from the group consisting of acrylic monomers and silicone-containing monomers.

6. The ophthalmic device material of claim 5 wherein the ophthalmic device material comprises from 0.005 to 0.2% (w/w) of the azo compound of claim 1.

7. The ophthalmic device material of claim 6 wherein the ophthalmic device material comprises from 0.01 to 0.1% (w/w) of the azo compound of claim 1.

8. The ophthalmic device material of claim 7 wherein the ophthalmic device material comprises from 0.01 to 0.05% (w/w) of the azo compound of claim 1.

9. The ophthalmic device material of claim 5 wherein the ophthalmic device material comprises a device-forming monomer of formula [II]:

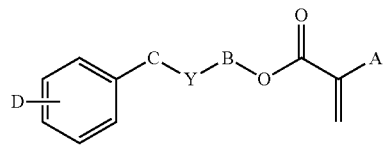

[II]

where in formula [II]:
A is H, CH$_3$, CH$_2$CH$_3$, or CH$_2$OH;
B is (CH$_2$)$_m$ or [O(CH$_2$)$_2$]$_z$;
C is (CH$_2$)$_w$;
m is 2-6;
z is 1-10;
Y is nothing, O, S, or NR', provided that if Y is O, S, or NR', then B is (CH$_2$)$_m$;
R' is H, CH$_3$, C$_n$H$_{2n'+1}$(n'=1-10), iso-OC$_3$H$_7$, C$_6$H$_5$, or CH$_2$C$_6$H$_5$;
w is 0-6, provided that m+w≦8; and
D is H, $C_1$-$C_4$ alkyl, $C_1$-$C_4$ alkoxy, C$_6$H$_5$, CH$_2$C$_6$H$_5$ or halogen.

10. The ophthalmic device material of claim 9 wherein in formula [II]:
A is H or CH$_3$;
B is (CH$_2$)$_m$;
m is 2-5;
Y is nothing or O;
w is 0-1; and
D is H.

11. The ophthalmic device material of claim 9 wherein the ophthalmic device material comprises a monomer selected from the group consisting of: 2-phenylethyl methacrylate; 4-phenylbutyl methacrylate; 5-phenylpentyl methacrylate; 2-benzyloxyethyl methacrylate; and 3-benzyloxypropyl methacrylate; and their corresponding acrylates.

12. The ophthalmic device material of claim 5 wherein the ophthalmic device material comprises a cross-linking agent.

13. The ophthalmic device material of claim 5 wherein the ophthalmic device material comprises a reactive UV absorbing compound.

14. An intraocular lens comprising the azo compound of claim 1.

15. An intraocular lens comprising the azo compound of claim 2.

16. An intraocular lens comprising the azo compound of claim 3.

17. An intraocular lens comprising the azo compound of claim 4.

18. An ophthalmic device comprising the ophthalmic device material of claim 5.

19. The ophthalmic device of claim 18 wherein the ophthalmic device is selected from the group consisting of an intraocular lens; a contact lens; a keratoprosthesis; and a corneal inlay or ring.

\* \* \* \* \*